US012051303B2

(12) United States Patent
Coppola et al.

(10) Patent No.: US 12,051,303 B2
(45) Date of Patent: Jul. 30, 2024

(54) SYSTEMS AND METHODS FOR VIRTUAL ITEM COLLECTION LOYALTY PROGRAMS

(71) Applicant: Aristocrat Technologies, Inc., Las Vegas, NV (US)

(72) Inventors: Roberto Coppola, Las Vegas, NV (US); Frank Rodriguez, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 213 days.

(21) Appl. No.: 16/891,905

(22) Filed: Jun. 3, 2020

(65) Prior Publication Data

US 2021/0012615 A1 Jan. 14, 2021

Related U.S. Application Data

(60) Provisional application No. 62/873,055, filed on Jul. 11, 2019.

(51) Int. Cl.
*G07F 17/32* (2006.01)

(52) U.S. Cl.
CPC ................................ *G07F 17/3255* (2013.01)

(58) Field of Classification Search
CPC .. G07F 17/34; G07F 17/3244; G07F 17/3258; G07F 17/3255
See application file for complete search history.

(56) References Cited

U.S. PATENT DOCUMENTS

| | | | | |
|---|---|---|---|---|
| 8,029,361 | B2 | 10/2011 | Hardy | |
| 8,512,134 | B2 | 8/2013 | Hardy | |
| 9,299,215 | B2 | 3/2016 | Gagner | |
| 9,483,906 | B2 * | 11/2016 | LeMay | G07F 17/3239 |
| 10,424,151 | B1 * | 9/2019 | Higgins | G07F 17/3204 |
| 2003/0055727 | A1 | 3/2003 | Walker | |
| 2007/0106553 | A1 * | 5/2007 | Jordan | G06Q 30/0209 463/20 |
| 2007/0259706 | A1 * | 11/2007 | Anderson | G07F 17/3239 463/16 |
| 2011/0207525 | A1 * | 8/2011 | Allen | G07F 17/32 463/25 |
| 2012/0282993 | A1 * | 11/2012 | Dorr | G07F 17/3267 463/20 |
| 2012/0315978 | A1 * | 12/2012 | LeMay | G06Q 50/34 463/43 |

(Continued)

*Primary Examiner* — Jasson H Yoo
(74) *Attorney, Agent, or Firm* — Armstrong Teasdale LLP

(57) ABSTRACT

A system is provided. The system includes an electronic gaming machine including a display and a controller. The system also includes a player tracking controller in communication with the electronic gaming machine. The player tracking controller is programmed to: a) store a plurality of tokens of a plurality of token collections, wherein each token collection of the plurality of token collections includes a predefined combination of specific tokens of the plurality of tokens and an award; b) receive, from the electronic gaming machine, gameplay information associated with a player; c) determine to award a token of the plurality of tokens to the player based on the gameplay information; and e) transmit a notification of the award of the token to the electronic gaming machine, wherein the electronic gaming machine is configured to display, on the display, the token that was awarded.

19 Claims, 9 Drawing Sheets

(56) References Cited

U.S. PATENT DOCUMENTS

| | | | | |
|---|---|---|---|---|
| 2014/0213333 | A1* | 7/2014 | Hanes | G07F 17/3255 463/9 |
| 2014/0364199 | A1* | 12/2014 | Baerlocher | G07F 17/3244 463/25 |
| 2016/0191666 | A1* | 6/2016 | Roireau | A63F 13/30 709/217 |
| 2017/0148277 | A1 | 5/2017 | Falciglia | |

* cited by examiner

SYSTEMS AND METHODS FOR VIRTUAL ITEM COLLECTION LOYALTY PROGRAMS

CROSS-REFERENCE TO RELATED APPLICATION

This application claims priority to U.S. Provisional Application Ser. No. 62/873,055, filed Jul. 11, 2019, entitled "SYSTEMS AND METHODS FOR VIRTUAL ITEM COLLECTION LOYALTY PROGRAMS," which is hereby incorporated by reference in its entirety.

TECHNICAL FIELD

The field of disclosure relates generally to electronic gaming, and more particularly to a virtual item collection loyalty program associated with an electronic gaming machine.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, a system is provided. The system includes an electronic gaming machine that includes a display and a controller. The system also includes a player tracking controller in communication with the electronic gaming machine. The player tracking controller is programmed to: a) store a plurality of tokens of a plurality of token collections, wherein each token collection of the plurality of token collections includes a predefined combination of specific tokens of the plurality of tokens and an award; b) receive, from the electronic gaming machine, gameplay information associated with a player; c) determine to award a token of the plurality of tokens to the player based on the gameplay information; and e) transmit a notification of the award of the token to the electronic gaming machine, wherein the electronic gaming machine is configured to display, on the display, the token that was awarded.

BRIEF DESCRIPTION OF THE DRAWINGS

An example embodiment of the subject matter disclosed will now be described with reference to the accompanying drawings.

DETAILED DESCRIPTION

Figure 1:
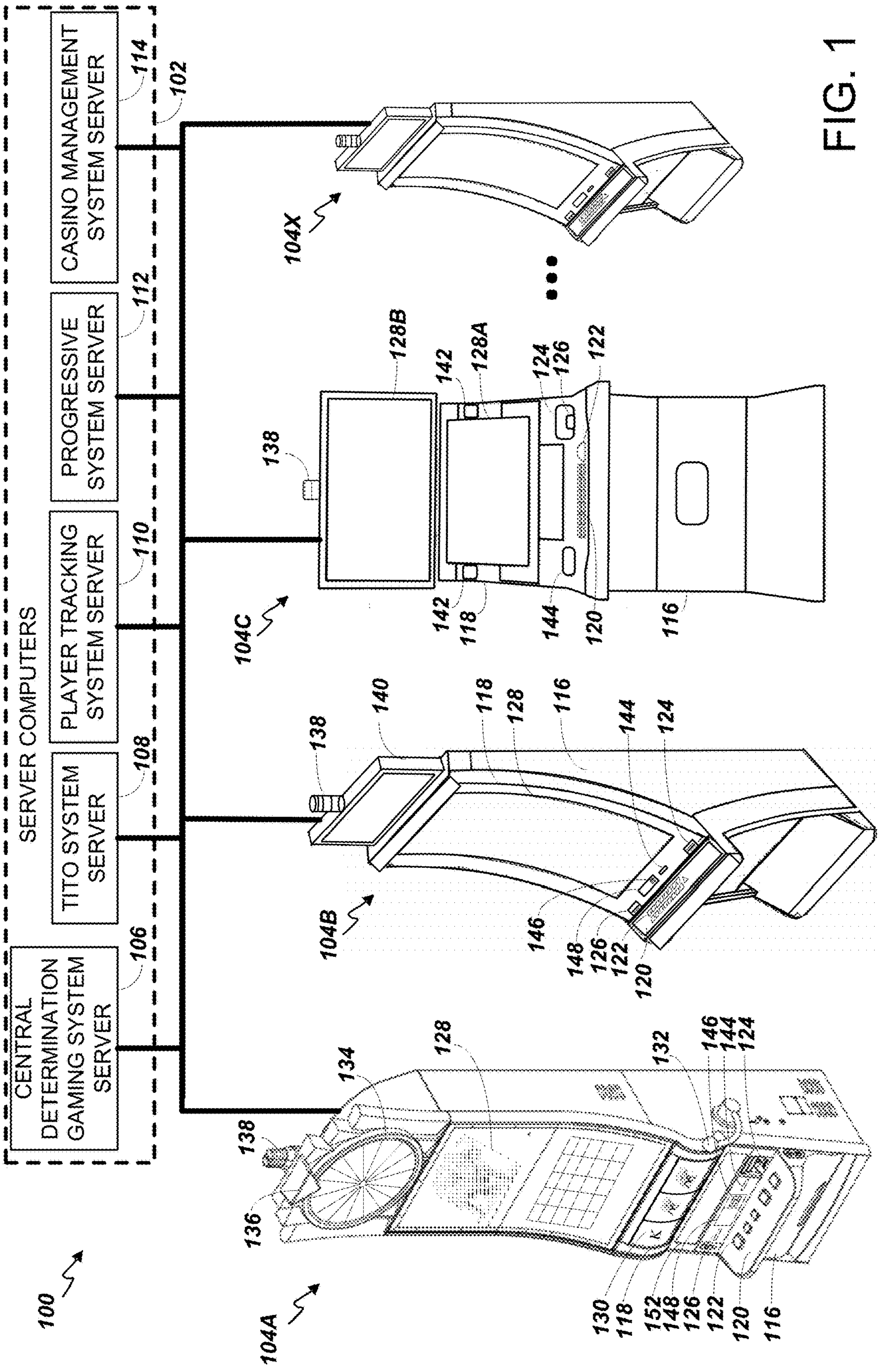
FIG. 1 is an exemplary diagram showing several EGMs networked with various gaming related servers.

The systems and methods described herein include a player tracking system server that stores a plurality of collections of virtual items. Each virtual item may be unique, and may be represented by and/or correspond to a unique electronic token. Each collection (sometimes referred to herein as a "token collection" or "virtual item collection" includes a predefined combination of specific virtual items to collect and an award for collecting all of the items in the corresponding collection. The player tracking system server tracks the virtual items collected by each player. The player is able to view the items collected and what items are still needed to complete the collections. When the collection is complete, the player can redeem the virtual items for the associated award. Awards may include free drinks, free meals, free gameplay, physical items, trips, room nights, and any other award deemed appropriate.

Players may gain virtual items based on gameplay on electronic gaming machines, checking in at specific locations (e.g., within a casino or elsewhere), purchasing specific items, such as meals, drinks, flights, etc. For example, the player tracking system may receive gameplay information corresponding to a gaming session at an electronic gaming machine, such as, for example, game outcomes, amount wagered, games played, time of play and/or other quantitative or qualitative measures, and may determine to award a specific virtual item based on the gameplay information. The virtual item may be awarded in addition to and/or independently of awards corresponding to the base game of the electronic gaming machine. The player tracking system may store records of each of the virtual items awarded to the player. Accordingly, the virtual item collection game is persistent across gaming sessions and electronic gaming machines. The player tracking system may communicate with a user device (e.g., a smartphone) associated with a player of the virtual item collection game, such that the player may track progress of the virtual item collection game even when the player is not present at a gaming site (e.g., an electronic gaming machine).

The systems and methods therefore embody a variety of technical aspects that are configured to achieve certain technical effects, such as, for example: (a) a data structure that includes a plurality of unique tokens corresponding to virtual items and a plurality of token collections each including a predefined combination of the unique tokens; (b) a player tracking system that provides a virtual item collection game that is persistent across electronic gaming machines and gaming sessions by storing records of tokens corresponding to unique virtual items awarded by electronic gaming machines in communication with the player tracking system; and (c) a player tracking system that enables remote progress tracking of a virtual item collection game by causing a user device to display an interface including a virtual item collection including a predefined combination of the unique virtual items and indicating one or more virtual items of the virtual item collection that have been awarded to the player in response to gaming activity at one or more electronic gaming machines in communication with the player tracking system.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a web site maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
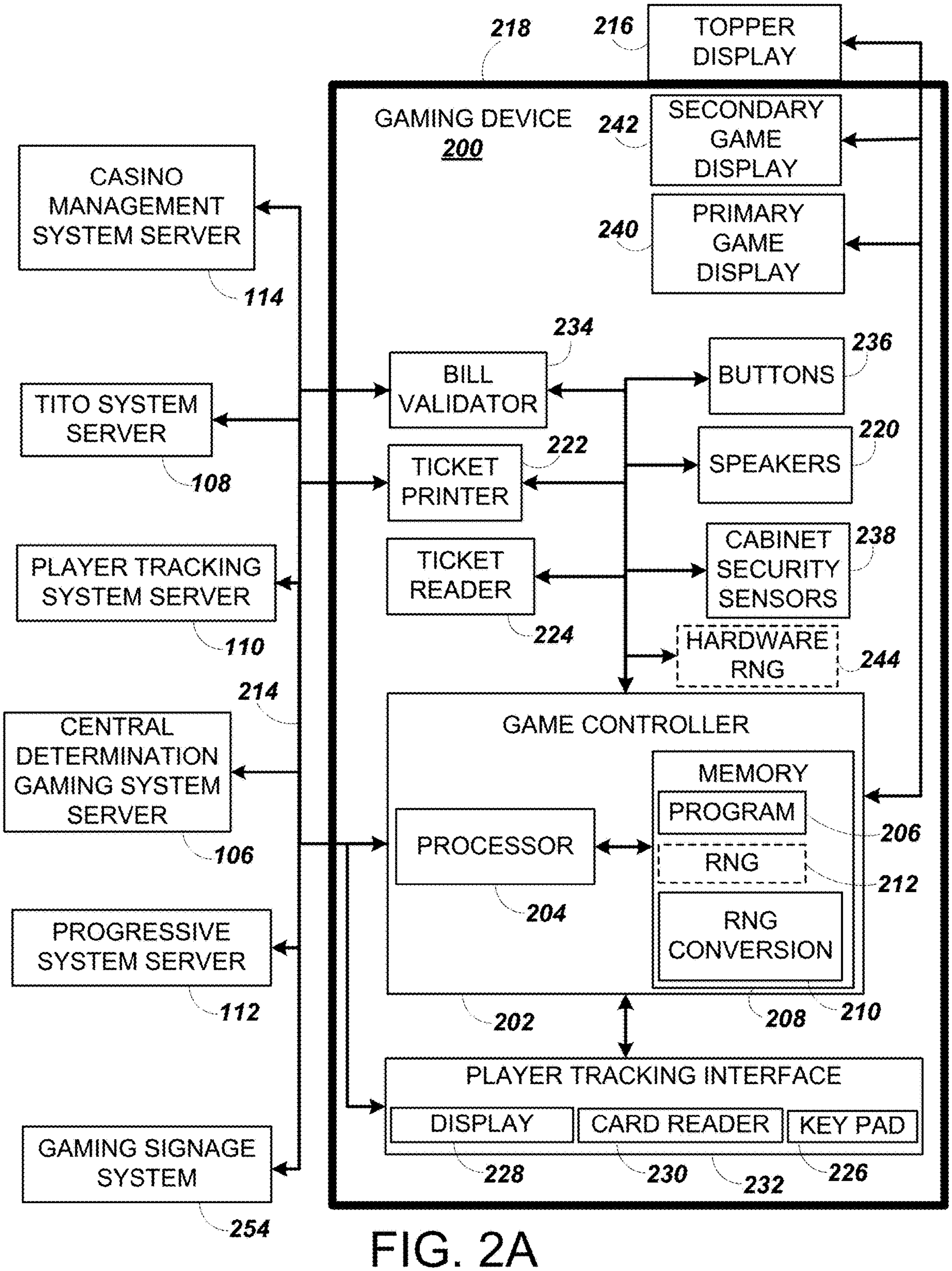
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that does not retain data values upon loss of power. Nonvolatile memory is memory that does retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
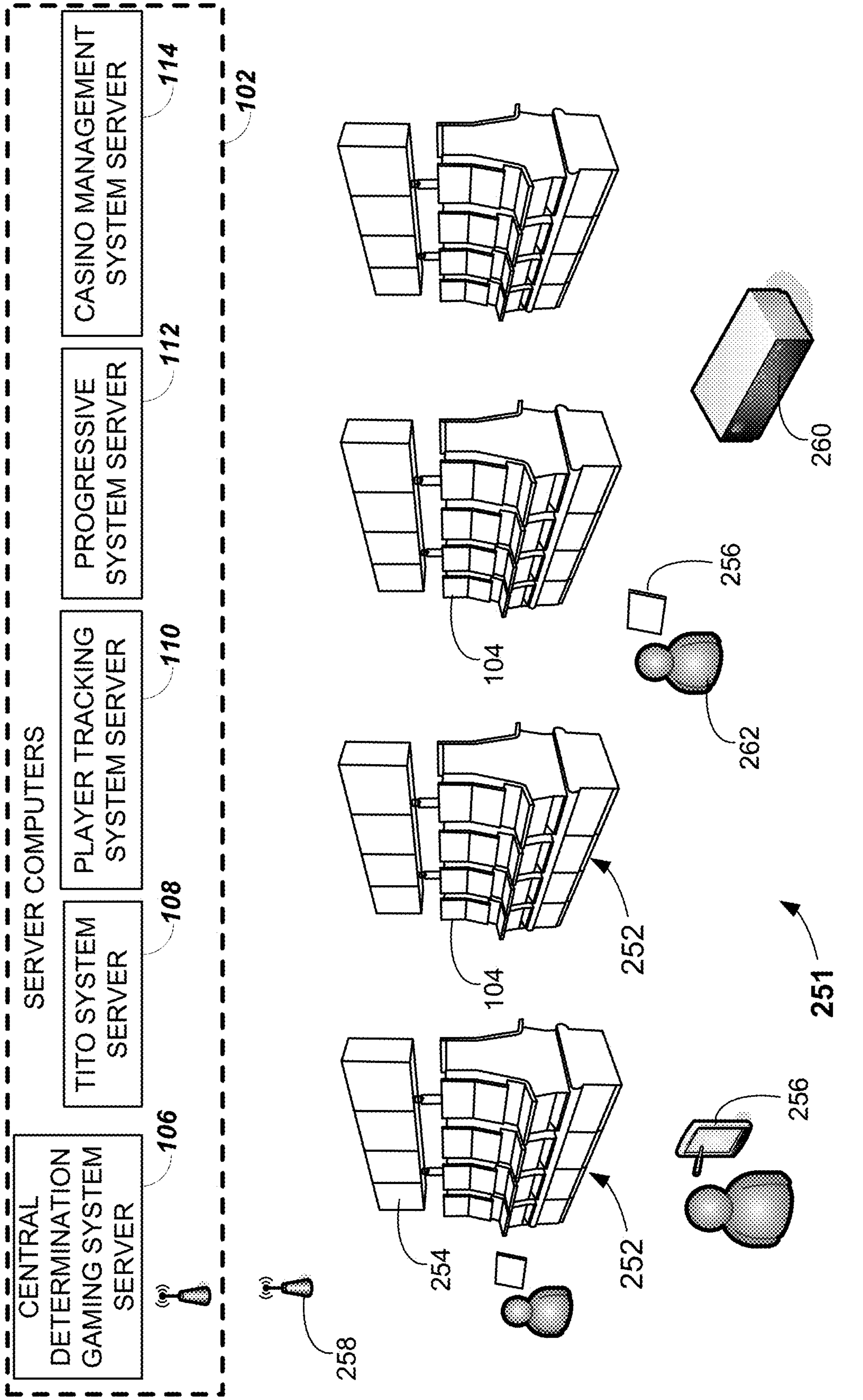
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
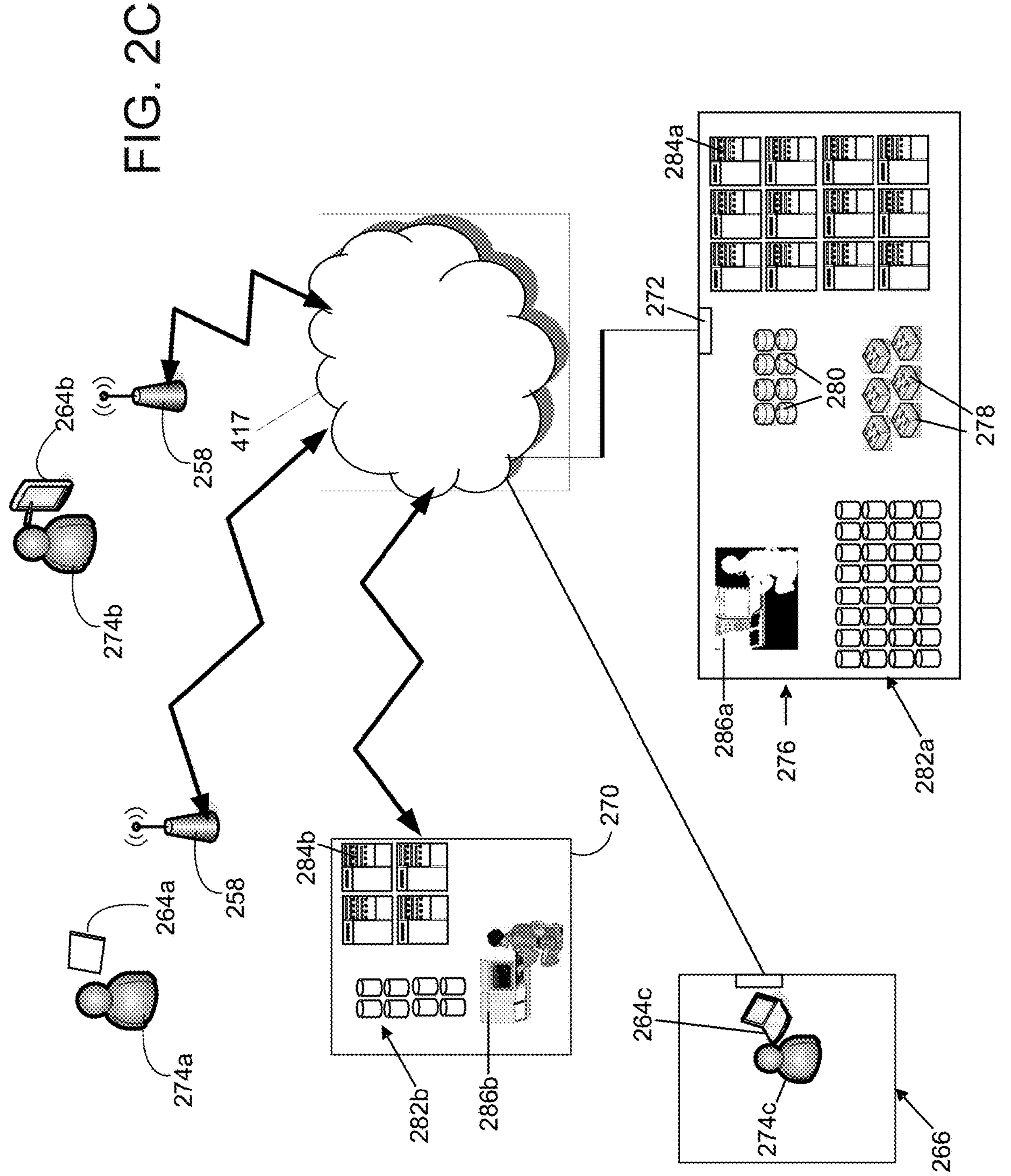
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) **264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264***c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
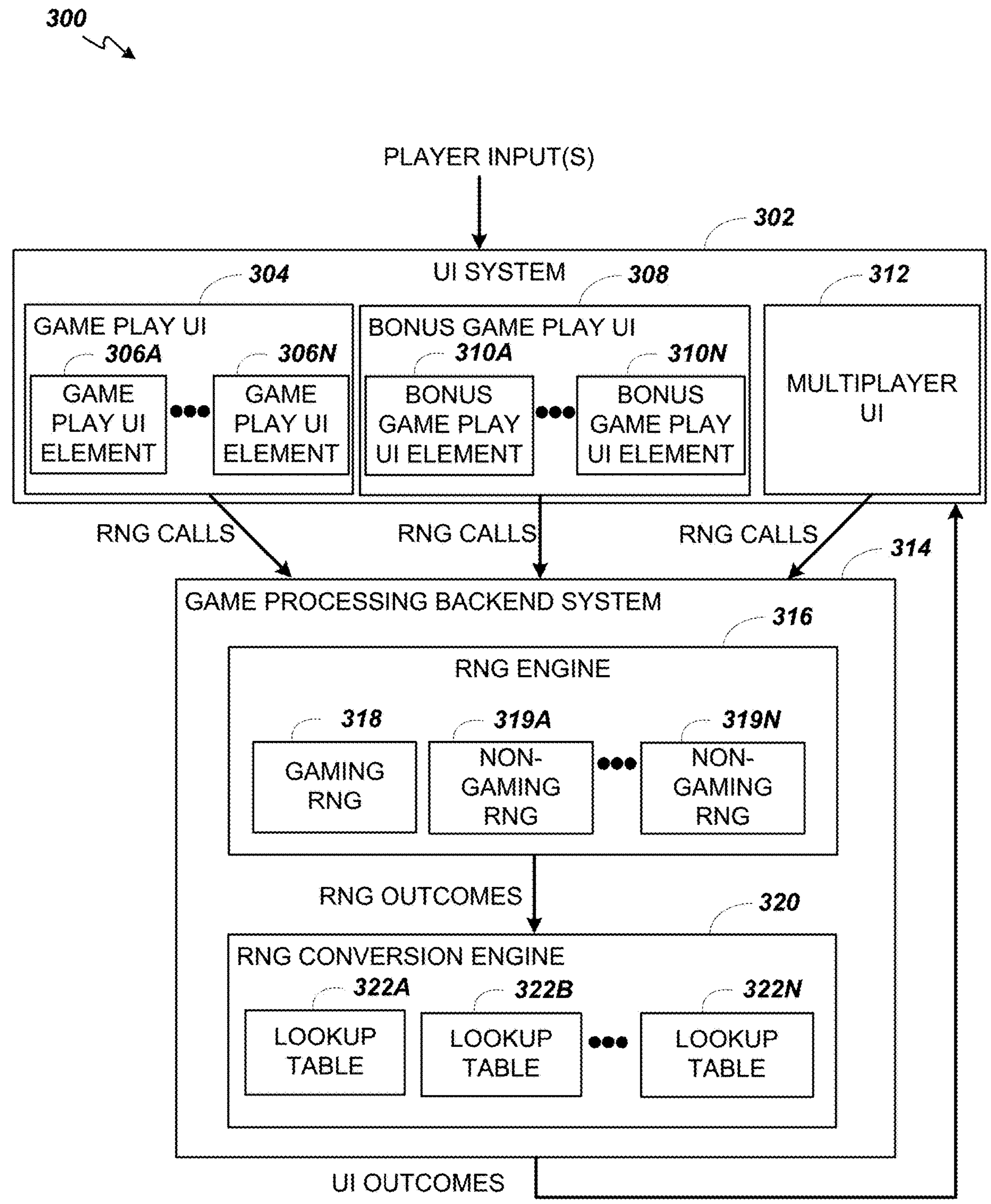
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
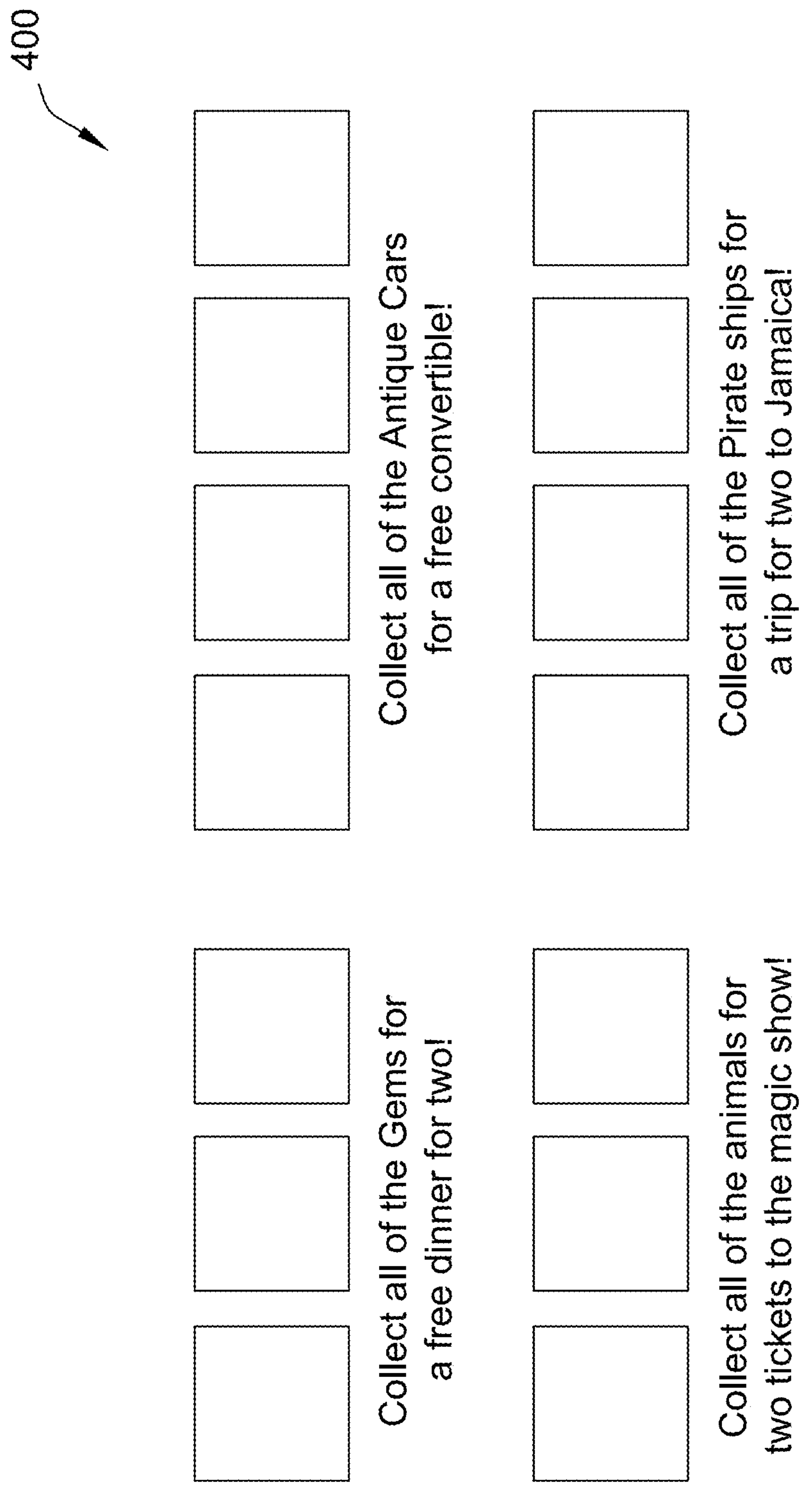
FIG. 4 is an exemplary user interface showing a virtual item collection game in accordance with one embodiment of the present disclosure.

FIG. 4 is an exemplary user interface showing a virtual item collection game 400 that may be played on the EGMs shown in system 100 (see FIG. 1). In an exemplary embodiment, the player tracking system server 110 (shown in FIG. 1) manages virtual item collection game 400 for each member of the loyalty program. Each individual player may be awarded virtual items that are a part of a set. Once the player has collected all of the items in the set, then the player may redeem the set of items for an award. For example, the player may collect four different gemstones (e.g., topaz, aquamarine, amethyst, and opal). Once the player has collected one of each of the gemstones in the set, the player may redeem the four gemstones for the associated reward, such as a free steak dinner.

The virtual items may be awarded to players based on gameplay at gaming device 200 (shown in FIG. 2A). When a player is playing a wagering game on gaming device 200 (shown in FIG. 2A) (e.g., a reel-based wagering game, a card-based wagering game, a keno game, a bingo game, and/or any other suitable wagering game), the player's gameplay is analyzed to determine if the player has met a condition for receiving a virtual item from one of the collections. The award of the virtual item may be based on, but is not limited to, the player getting a specific combination of symbols on the game, exceeding a specific period of time playing on the gaming device 200, exceeding a threshold of amount played, and exceeding a minimum bet threshold for a period of time.

In some embodiments, the award of the virtual item is displayed on the display screen (such as the primary game display 240 or the secondary game display 242 both shown in FIG. 2) of the gaming device 200. For example, the gaming device 200 may display an animation, a picture of the virtual item, and a message "Congratulations, you have won the Jade piece! Collect the Turquoise and Sapphire pieces to win an exotic getaway for two to Jamaica!" In some of these embodiments, the award of the virtual item may be displayed with an optical code, such as a quick response (QR) code, barcode, or other identifier that the player will need to capture (such as by taking a picture of). In these embodiments, the player may have an application on a user device, such as their mobile computer device (e.g., smartphone) that allows them to capture the QR code, barcode, or other identifier and add the virtual item to their collection. In other embodiments, the optical code may take the player to a website that allows them to download the app or to join the loyalty program. In still other embodiments, the gaming device 200 prints out a ticket with the QR code or barcode representing the virtual item. In some embodiments, gaming device 200 may be in communication with a three dimensional (3D) printer, and may cause the 3D printer to print an object representing the awarded token. In another embodiment, a representation of the virtual item is transmitted to the player via an SMS or email. In further embodiments, a notification of the award of the virtual item is transmitted to the player tracking system server 110. In further embodiments, the user device may store a record of the token awarded to the player via communication with player tracking system server 110 (e.g., over a cellular-based or WLAN-based Internet connection) in response to reading the QR code or barcode. In some embodiments, the player is asked by the gaming device 200 how they wish to receive the virtual item.

In some embodiments, the virtual items associated with each player are stored in a database by the player tracking system server 110. When a new virtual item is awarded, player tracking system server 110 may store a token in the database representing that the player has gained that token. In some embodiments, the player may gain multiple copies of the same token. For example, the player may earn four copies of the topaz virtual item. This allows the player to redeem multiple sets of items that they collect.

In one embodiment, the player may view their collections on an app or website. In these embodiments, the app or website is able to access the database associate with the player tracking system server 110 to determine which tokens the player has collected and then display those tokens to the player. For example, if the player has the Jade and Turquoise pieces for the Jamaican vacation prize, the user device may display three boxes. In the Jade and Turquoise boxes, the virtual item is displayed in color. In the Sapphire box, which the player has yet to collect, the gemstone is greyed out or only shown in outline. This allows the player to know how many and which pieces, they still have to collect to win.

In some embodiments, player tracking system server 110 and/or gaming device 200 may communicate with a user device (e.g., a smart phone) associated with the player, for example, to enable the user to view tokens the player has collected or receive notifications that a token has been awarded to the player. The player tracking system server 110 may identify that the user device is associated with the player present at gaming device 200. When the user device associated with the player has been identified, player tracking system server may transmit a notification to the user device in response to a token being awarded at gaming device 200, and the user device may display the notification. For example, the notification may be an email, text message, or push notification received via the app or website. In some embodiments, player tracking system server 110 may identify the user device as associated with the player based on the location of the user device (e.g., a proximity of the user device to gaming device 200). For example, the user device may include a global positioning system (GPS) that generates GPS data. Player tracking system server 110 may receive such data from the user device (e.g., via a cellular-based or WLAN-based Internet connection), and may determine that the user device is proximate to gaming device 200 based on the GPS data, enabling the user device to be associated with the player presently active at gaming device 200. While such functionality may be performed in the background by player tracking system server 110, it may appear to the user that the user device is communicating directly with gaming device 200, providing a seamless gaming experience. Additionally, or alternatively, gaming device 200 may be configured to communicatively couple directly to the user device (e.g., via near field communication or Bluetooth). In response to the communicative coupling, gaming device 200 may transmit an indicator to player tracking server system 110 including an identifier of the user device, based on which player tracking system server 110 may associate the user device with the player presently active at gaming device 200. In other embodiments, player tracking system server 110 may identify the player at gaming device 200 through the entry of, for example, login information or a loyalty card corresponding to a loyalty account, and may identify the user device based on an association of the user device with the loyalty account.

In some embodiments, the player may be awarded virtual items based on places that they have visited or the number of times that they have visited. For example, if a player has visited a specific casino a specific number of times, they may be awarded a virtual item. Or if the player visits the buffet restaurant within the casino property between specific hours, they may be awarded a piece. This may help drive customers to specific locations. In these examples, the players may receive physical tokens, also known as tickets with QR codes, that they may scan to gain the virtual items for their collections. Additionally, or alternatively, player tracking server system 110 may be in communication with a point of sale (POS) device associated with the purchase of an item (e.g., at the buffet restaurant). The POS device may transmit transaction data corresponding to the purchase to player tracking system server 110, and player tracking system server 100 may determine that the player should be awarded a token based on the purchase. This may extend beyond the casino (or casinos) to casino partners, third party partners, and advertising partners, where each of them may provide virtual items for visiting them or using their services. The partners may also provide collections for specific prizes. For example, an airline may provide a collection that awards 10,000 airline miles for that carrier when completed. This could also be used to push surplus inventory. For example, one of the restaurants in the casino may have a special on steak dinners, where whoever orders one gets a virtual item game piece. Alternatively, the steak dinner could be listed or identified as one of the collection awards.

Virtual items may be awarded via social media. For example, the casino could send out a virtual item via social media and anyone that scans it gains the item. This may be for a new collection, where the first item is sent out via social media, but to complete the collection, the players will need to visit the casino and perform specific tasks to get more virtual items in the set. In addition, players may send out social media messages saying that they were awarded specific virtual items or messages inviting others to play. If other players activate the invitations, both they and the player that sent the message may be awarded virtual items.

In other embodiments, players may share virtual items. For example, a player may be able to text or otherwise transmit a virtual item or partial virtual item to a friend (e.g., via input in the app or website). In response to such an action, player tracking system server 110 may update records associated with the player and the friend to reflect a transfer or partial transfer of the virtual item from the player to the friend. If the friend performs a specific action, such as joining the loyalty program, then both of them may be awarded the virtual item. Players may also gain additional virtual items for every person they successfully invite to join the loyalty program, with additional virtual items based on that number exceeding a threshold. Players may also gain virtual items for inviting friends to visit a specific casino and the friend doing so within a specific period of time.

In the exemplary embodiment, the virtual items awarded are random. Some of the virtual items may be common and easy to get, while other items may be rare. Each time the player earns a virtual item, the item may be randomly determined based on the items in the set or collection. The player tracking system server 110 may use a RNG to determine which virtual item to award. For example, gaming device 200 or player tracking system server 110 may perform an RNG call, and in response to the outcome of the RNG call, parse a pay table including a plurality of possible RNG call outcomes and candidate tokens associated with at least some of the possible outcomes to determine if a token should be awarded. Sometime, the virtual item awarded may be specific based on the activity (i.e., the social media award to get the collection started).

In some embodiments, the virtual item awarded may be specific to a collection. For example, playing a pirate themed gaming device 200 may award virtual items from a pirate themed set. In other embodiments, the virtual item awarded may be from a group of collections or all of the available collections. This distribution may be announced to the players.

In some embodiments, the collections may be for only a specific period of time. For example, in a collection based on a holiday, such as the Chinese New Year, players may only gain pieces for this collection during a predetermined period of time around the holiday. The awards may also only be redeemable during that or another predetermined period of time. In some embodiments, the collection may go dormant until the holiday the next year.

In some embodiments, players may be able to trade or transfer virtual items among each other. For example, in some such embodiments, player tracking system server 110 may receive a request message to transfer the token from a first player to a second player, for example, via a user device associated with the first player. Player tracking system 110 may then update records of tokens of the first player to delete the token, and may records of tokens of the second player to include the transferred token. This may be through a trading platform hosted by the player tracking system server 110. A player may offer a virtual item in exchange for another virtual item from the same set or from a different set. In some embodiments, the players may auction off virtual items or rewards. For example, if a patron who happens to follow a vegan diet wins a steak dinner as a prize, that patron may decide to auction off that award to another person, possibly for half the price of the steak dinner.

In some further embodiments, multiple casino brands may have different virtual item collection games 400. In these embodiments, a clearinghouse may allow players trade virtual items from one casino brand for virtual items in another casino brand.

In some embodiments, the player may redeem a completed collection for either the listed reward or a cash prize.

Virtual items may be gained by players for one of, but not limited to, the following activities: gameplay on one or more gaming devices 200 including: amount of time played, total amount bet during a period of time, amount bet in excess of minimum bet, bets per a period of time, bet level, bet per hand or spin, and specific combinations of symbols; purchases at a specific location, including: meals or drinks at a specific restaurant, room nights, and airline flights; visiting a specific location, either per visit, per number of visits in a period of time, and at a specific period of time; joining a loyalty program or causing others to join the loyalty program; causing others to visit the specific location; sending or receiving items through social media; and/or trading the virtual items.

Awards may include, but are not limited to, free drinks, free food, free gameplay, free hotel nights, free trips, free flights, free services, free physical items (i.e., from the gift shop like a special pin, luggage tag, or clothing), social media badges, free entertainment tickets, reward points, reward program status levels, special access, or coupons or discounts.

Figure 5:
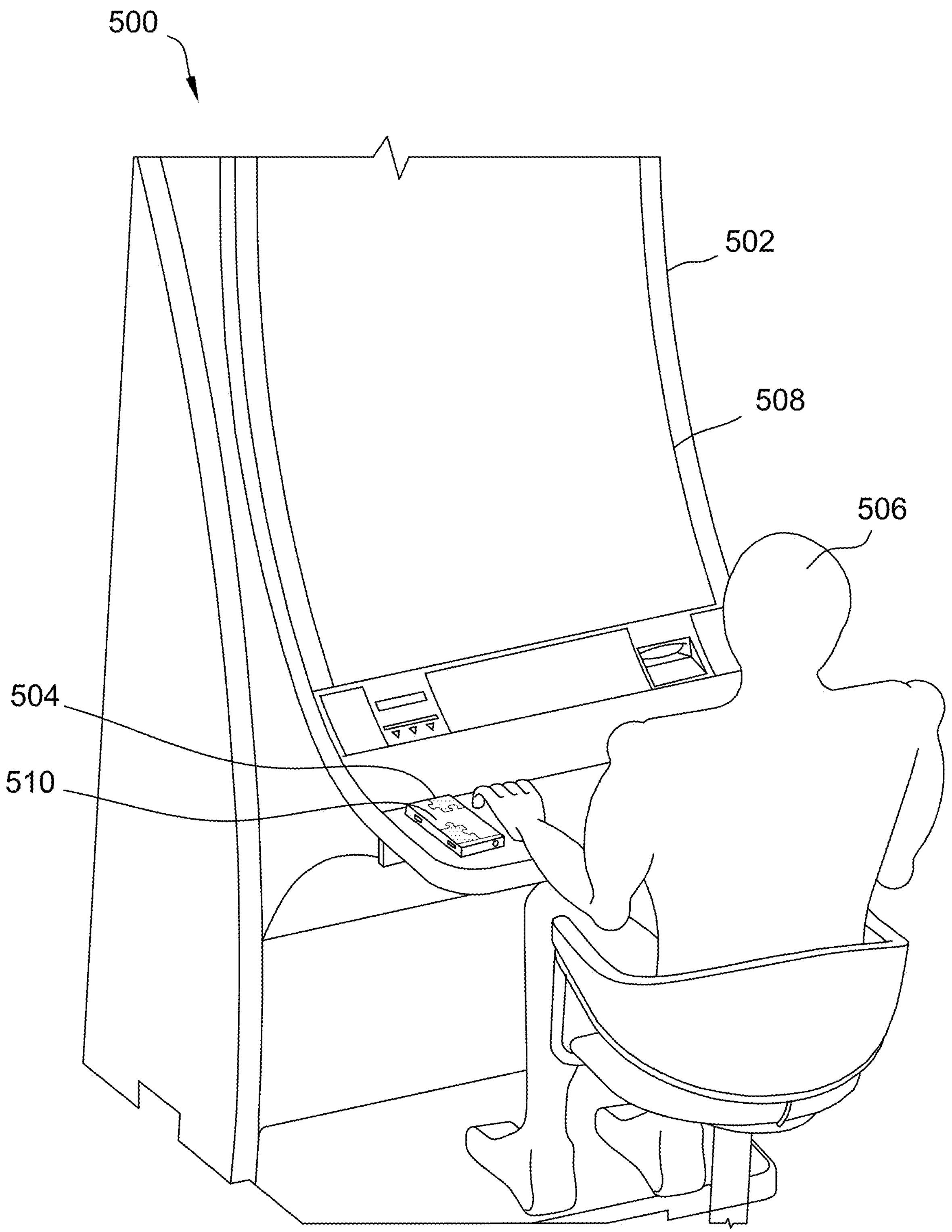
FIG. 5 is an exemplary virtual item collection game system in accordance with one embodiment of the present disclosure.

FIG. 5 is an example virtual item collection game system 500 that may be used to play virtual item collection game 400 (described with respect to FIG. 4). Virtual item collection game system 500 includes a gaming machine 502 and a user device 504, which may be associated with a player 506. Gaming machine 502 may be substantially similar to gaming devices 104A-104X (shown in FIG. 1) and/or gaming device 200 (shown in FIG. 2A). Gaming device 502 includes a game display 508, which may be substantially similar to main display 128 (shown in FIG. 1) and/or primary game display 240 (shown in FIG. 2A). Gaming machine 502 may display, for example, gameplay elements and game outcomes of a base game on game display 508, as described with respect to FIGS. 1-4. Gaming machine 502 may further display information related to virtual item collection game 400, such as a notification that player 506 has been awarded a token or information about tokens player 506 has previously been awarded. In some embodiments, as described with respect to FIG. 4, the determination to award the token to player 506 may be based on, for example, an outcome of the base game, an RNG call performed simultaneously with the base game, or another event.

User device 504 may be, for example, a smartphone, and may include a display 510, which may be, for example, a liquid crystal display touchscreen. As described above with respect to FIG. 4, user device 504 may be configured to display notifications and information (e.g., awarded tokens) related to virtual item collection game 400. For example, user device 504 may display notifications that the token has been awarded, or as described in further detail below with respect to FIGS. 6 and 7, display a representation of a token set including tokens that the player has already been awarded (e.g., in full color) and tokens that the player has yet to be awarded (e.g., as greyed or blacked out, or as a silhouette).

Gaming machine 502 may communicate with user device 504, for example, to enable the user to view tokens the player has collected or receive notifications that a token has been awarded to the player. In some embodiments, gaming machine 502 may communicate with user device 504 via player tracking system server 110 (shown in FIG. 1). Player tracking system server 110 may identify that user device 504 is associated with player 506, and accordingly, that player 506 is the player active at gaming device 502. Player tracking system server 110 server may transmit a notification to user device 504 in response to a token being awarded at gaming machine 502, and user device 504 may display the notification. For example, the notification may be an email, text message, or push notification received via the app or website. In some embodiments, player tracking system server 110 may identify user device 504 as being associated with player 506 based on the location of user device 504 (e.g., a proximity of user device 504 to gaming machine 502). For example, the user device may include a global positioning system (GPS) that generates GPS data. Player tracking system server 110 may receive such data from the user device (e.g., via a cellular-based or WLAN-based Internet connection), and may determine that user device 504 is proximate to gaming machine 502 based on the GPS data, enabling user device 504 to be associated with player 506. While such functionality may be performed in the background by player tracking system server 110, it may appear to player 506 that user device communicates directly with gaming machine 502, providing a seamless gaming experience. Additionally, or alternatively, gaming machine 502 may be configured to communicatively couple directly to user device 504 (e.g., via near field communication or Bluetooth). In response to the communicative coupling, gaming machine 502 may transmit an indicator to player tracking server system 110 including an identifier of user device 504, based on which player tracking system server 110 may associate user device 504 with player 506. In other embodiments, player tracking system server 110 may identify the player at gaming machine 502 through the entry of, for example, login information or a loyalty card corresponding to a loyalty account at gaming machine 502, and may identify the user device based on an association of user device 504 with the loyalty account.

Figure 6:
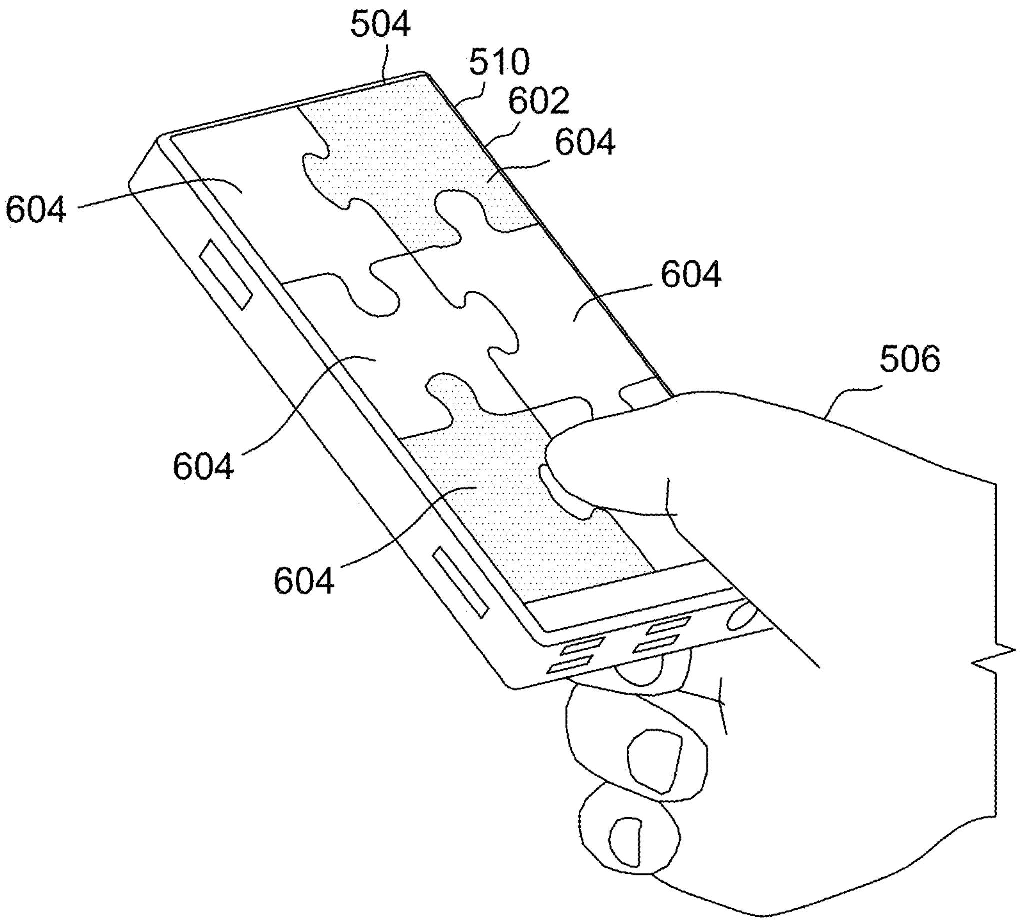
FIG. 6 is an exemplary user device that may be used in the virtual item collection game system shown in FIG. 5 in accordance with one embodiment of the present disclosure.

FIG. 6 depicts user device 504 used in virtual item collection game system 500. As shown in FIG. 6, user device 504 may display an example user interface 602. User device 504 may display user interface 602, for example, in response to user accessing the app or website associated with virtual item collection game 400. User interface 602 may include a plurality of token spaces 604. For example, each token space 604 may correspond to a puzzle piece, wherein each puzzle piece corresponds to a token and the entire puzzle corresponds to the token set. When the player is awarded a token, a token space 604 corresponding to the awarded token may be colored in to reveal a portion of an image, while tokens that the player has not yet been awarded may remain blacked out. Accordingly, as player 506 continues to be awarded tokens associated with the token set, the puzzle image is progressively completed. When each of the tokens (i.e., puzzle pieces) of the token set has been awarded and the puzzle has been completed, player 506 may be awarded a prize (as described with respect to FIG. 4). As shown in FIG. 6, player 506 has currently been awarded four out of six tokens of the token set, corresponding to the four filled in token spaces 604. In some embodiments, user interface 602 may be viewed on user device 504 even when user device 504 is not present at the site of gaming device 502. Accordingly, user interface 602 may remind player 506 of incentives to play virtual item collection game 400 even when player 506 is away from gaming device 502. For example, in some embodiments, user device 504 may periodically display notifications to player 506 that player 506 has a partially completed token set to encourage player 506 to play virtual item collection game 400.

Figure 7:
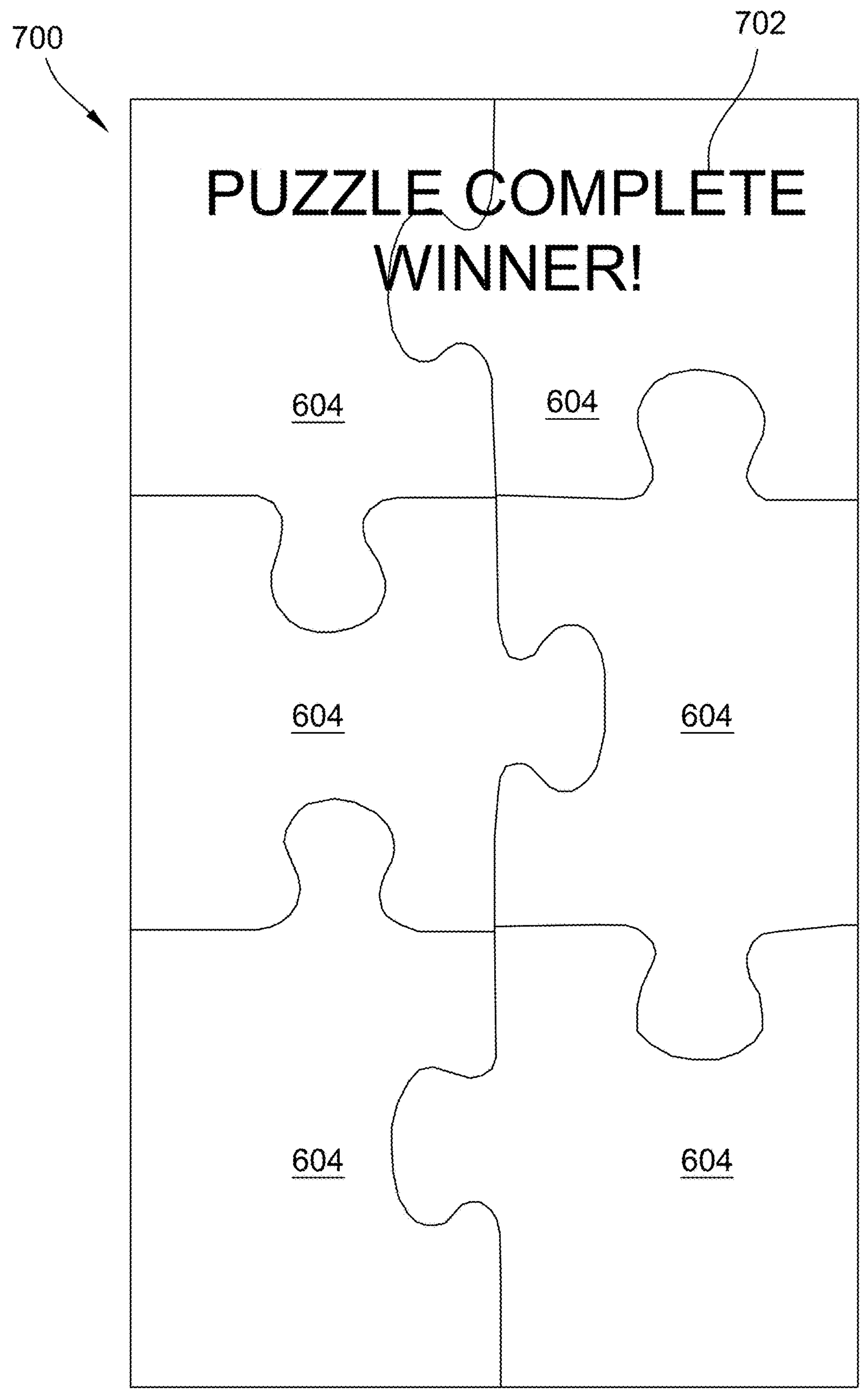
FIG. 7 is an exemplary user interface for the virtual item collection game system shown in FIG. 5 in accordance with one embodiment of the present disclosure.

FIG. 7 depicts an example user interface 700 for the virtual item collection game system 500. User interface 700 may be displayed by user device 504 (shown in FIGS. 5 and 6), and may be substantially similar to user interface 602 (shown in FIG. 6). Like user interface 602, user interface 700 includes token spaces 604. As shown in FIG. 7, each of token spaces 604 is filled in, indicating that user 506 has been awarded each token in the token set, for example, by gaming machine 502 (shown in FIG. 5), other gaming machines, or other events (as described with respect to FIG. 4). In response to the token set being completed, user interface 700 may display a completion indicator 702 (e.g., "PUZZLE COMPLETE/WINNER!"). In some embodiments, when completion indicator 702 is displayed, user device 504 may additionally play sounds and/or vibrate to notify player 506 that the token set has been completed. As described with respect to FIG. 4, player 506 may then present user interface 700 to an operator or associated entity to obtain a prize, share that user 506 has won via social media, or use user device 504 to obtain the prize electronically.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and non-volatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A system comprising:

an electronic gaming machine including a display, a controller, and a first RNG engine configured to generate an output from a random number generator (RNG); and a player tracking controller in communication with the electronic gaming machine, at least one non-gaming device configured to detect a non-gaming trigger, and a user device associated with a player, the player tracking controller including a second RNG engine configured to generate a second output from an RNG, wherein the player tracking controller is programmed to:

store a plurality of tokens of a plurality of token collections, wherein each token collection of the plurality of token collections includes a predefined combination of specific tokens of the plurality of tokens and an award;

identify the player as being present at the electronic gaming machine based on the user device being located proximate to the gaming machine;

receive, from the electronic gaming machine, gameplay information associated with the player;

determine to award a first token of the plurality of tokens to the player based on the gameplay information and on the identification of the player as being present at the electronic gaming machine, wherein the first token is included in a first token collection of the plurality of token collections;

randomly determine, from the first token collection, the first token to award the player based on an RNG output from the first RNG engine;

transmit a first notification message to the electronic gaming machine or the user device, wherein the first notification message causes the electronic gaming machine or the user device to display a user interface having a predefined area and comprising a plurality of token spaces collectively forming an image that fills the predefined area, each of the plurality of token spaces associated with i) a respective portion of the image and ii) a respective token of one of the plurality of token collections, wherein in response to the first token being awarded, the portion of the image associated with the first token is revealed;

receive, from the non-gaming device, data in response to detecting the non-gaming trigger;

identify a second token collection of the plurality of token collections based on the data received from the non-gaming device, wherein the second token collection is associated with the non-gaming trigger, and wherein the second token collection is a same token collection as the first token collection or a different token collection from the first token collection;

randomly determine a second token from the second token collection associated with the non-gaming trigger to award to the player based on an RNG output from the second RNG engine performed in response to the non-gaming trigger;

transmit a second notification message to the user device, wherein the second notification message causes the user device to display the user interface, wherein in response to the second token being awarded, the portion of the image associated with the second token is revealed; and in response to each portion of the image being revealed, cause the user device to display a text overlay message over the predefined area of the user interface.

2. The system in accordance with claim 1, wherein the player tracking controller is further programmed to:

store a plurality of records of tokens awarded to the player;

update, in response to determining to award the token to the player, the plurality of records of tokens to include the awarded token;

determine, based on the plurality of records of tokens, that the player has been awarded each the of the predefined combination of tokens associated with a token collection of the plurality of token collections; and award, to the player, the award associated with the determined token collection.

3. The system in accordance with claim 2, and wherein the player tracking controller is further programmed to:

identify the user device as associated with the player; and transmit a second notification of the award of the token to the user device, wherein the user device is configured to display the token that was awarded.

4. The system in accordance with claim 3, wherein the player tracking controller is further programmed to:

identify the tokens associated with a token collection that have been awarded to the player; and transmit a message including the identified tokens to the user device, wherein the user device is configured to display the identified tokens simultaneously.

5. The system in accordance with claim 1, wherein the user device includes a global positioning system (GPS) configured to generate GPS data, and wherein to identify the player as being present at the electronic gaming machine, the player tracking controller is further programed to:

receive GPS data from the user device;

determine that the user device is proximate to the electronic gaming machine based on the GPS data; and identify the player as being present at the electronic gaming machine based on the determination.

6. The system in accordance with claim 1, wherein the electronic gaming machine is configured to communicatively couple to the user device, and wherein to identify the player as being present at the electronic gaming machine, the player tracking controller is programmed to:

receive, from the electronic gaming machine, an indicator that the user device is communicatively coupled to the electronic gaming machine; and identify the player as being present at the electronic gaming machine based on the indicator.

7. The system in accordance with claim 2, wherein the player tracking controller is further programmed to:

receive a request message to transfer the token to a second player;

update the plurality of records of tokens of the player to delete the token; and update a second plurality of records of tokens of the second player to include the token.

8. The system in accordance with claim 1, wherein to determine to award the token to the player, the player tracking controller is programmed to award the token based on a determination that the player has been awarded a specific combination of symbols by the electronic gaming machine.

9. The system in accordance with claim 1, wherein to determine to award the token to the player, the player tracking controller is programmed to award the token based on a determination that the player has been active at the electronic gaming machine for greater than a threshold period of time.

10. The system in accordance with claim 1, wherein to determine to award the token to the player, the player tracking controller is programmed to award the token based on a determination that the player has wagered an amount at least a threshold amount at the electronic gaming machine.

11. The system in accordance with claim 1, wherein to determine to award the token to the player, the player tracking controller is programmed to award the token based on a determination that the player has exceeded a minimum bet threshold at the electronic gaming machine a threshold number of times.

12. The system in accordance with claim 1, wherein the electronic gaming machine is further configured to display an optical code associated with the awarded token in response to receiving the notification of the award, wherein when read by a user device, causes the user device to store a record of the token awarded to the player.

13. The system in accordance with claim 12, wherein the optical code is at least one of a quick response (QR) code and a barcode.

14. The system in accordance with claim 1, wherein the electronic gaming machine is configured to print out a ticket including the awarded token in response to receiving the notification of the award.

15. The system in accordance with claim 14, wherein the ticket includes at least one of a QR code and a barcode representing the awarded token.

16. The system in accordance with claim 1, further comprising a three dimensional (3D) printer, wherein the player tracking controller is further programmed to transmit a second notification of the award of the token to the 3D printer, and wherein the 3D printer is configured to print an object representing the token in response to receiving the second notification of the award.

17. The system in accordance with claim 1, wherein the non-gaming device is a point of sale (POS) device, and wherein the non-gaming trigger is a sale of an item at the POS device.

18. The system of claim 1, wherein the player tracking controller is further programed to:

retrieve a table of one or more predefined conditions for awarding the first token; and parse the table based on the gameplay information to identify a match between the gameplay information and the one or more predefined conditions to determine to award the first token.

19. A system comprising:

an electronic gaming machine including a display and a controller; and a player tracking controller in communication with the electronic gaming machine, at least one non-gaming device configured to detect a non-gaming trigger, and a user device associated with a player, the player tracking controller including an RNG engine configured to generate an output from an RNG, wherein the player tracking controller is programmed to:

store a plurality of tokens of a plurality of token collections, wherein each token collection of the plurality of token collections includes a predefined combination of specific tokens of the plurality of tokens and an award;

identify the player as being present at the electronic gaming machine based on the user device being located proximate to the gaming machine;

receive, from the electronic gaming machine, gameplay information associated with the player;

determine to award a first token of the plurality of tokens to the player based on the gameplay information and on the identification of the player as being present at the electronic gaming machine, wherein the first token is included in a first token collection of the plurality of token collections;

transmit a first notification message to the electronic gaming machine or the user device, wherein the first notification message causes the electronic gaming machine or the user device to display a user interface having a predefined area and comprising a plurality of token spaces collectively forming an image that fills the predefined area, each of the plurality of token spaces associated with i) a respective portion of the image and ii) a respective token of one of the plurality of token collections, wherein in response to the first token being awarded, the portion of the image associated with the first token is revealed;

receive, from the non-gaming device, data in response to detecting the non-gaming trigger;

identify a second token collection of the plurality of token collections based on the data received from the non-gaming device, wherein the second token collection is associated with the non-gaming trigger, and wherein the second token collection is a same token collection as the first token collection or a different token collection from the first token collection;

randomly determine a second token from the second token collection associated with the non-gaming trigger to award to the player based on an RNG the output from the RNG engine performed in response to the non-gaming trigger;

transmit a second notification message to the user device, wherein the second notification message causes the user device to display the user interface, wherein in response to the second token being awarded, the portion of the image associated with the second token is revealed; and in response to each portion of the image being revealed, cause the user device to display a text overlay message over the predefined area of the user interface.

* * * * *